United States Patent [19]

Harada

[11] Patent Number: 4,715,270

[45] Date of Patent: Dec. 29, 1987

[54] BEVERAGE BREWING APPARATUS FOR VENDING MACHINES

[75] Inventor: Tsutomu Harada, Takasaki, Japan

[73] Assignee: Sanden Corporation, Gunma, Japan

[21] Appl. No.: 810,171

[22] Filed: Dec. 18, 1985

[30] Foreign Application Priority Data

Dec. 28, 1984 [JP] Japan .................. 59-196715[U]

[51] Int. Cl.[4] ............................................. A47J 31/00
[52] U.S. Cl. .................................. 99/289 R; 99/302 P
[58] Field of Search .................. 99/279, 289 R, 289 T, 99/289 P, 280, 281, 282, 283, 287, 302 P; 426/433

[56] References Cited

U.S. PATENT DOCUMENTS

| | | | |
|---|---|---|---|
| 3,213,777 | 10/1965 | Heier | 99/289 T |
| 3,349,690 | 10/1967 | Heier | 99/283 |
| 3,660,117 | 5/1972 | Neely | 99/289 R |
| 4,271,753 | 6/1981 | Neely | 99/289 R |
| 4,305,328 | 12/1981 | Kueser | 99/289 R |

*Primary Examiner*—Robert W. Jenkins
*Attorney, Agent, or Firm*—Banner, Birch, McKie & Beckett

[57] ABSTRACT

A beverage brewing apparatus for use in vending machines has an open top and open bottom cylinder that is vertically movably supported by a frame on rods. A piston is also vertically movably supported by the rods and is normally pushed upwardly by coil springs disposed surrounding the rods. Bias springs are disposed between the frame and cylinder to push the cylinder dowardly whereby the sealing situation between the cylinder and brewing cavity is assured during progress of the brewing operation within the apparatus.

2 Claims, 5 Drawing Figures

BEVERAGE BREWING APPARATUS FOR VENDING MACHINES

BACKGROUND OF THE INVENTION

This invention relates to a beverage brewing apparatus suitable for use in a beverage vending machine, and more particularly, to improvment of the sealing situation between the brewing liquid cylinder and brewing cavity of such an apparatus during the brewing operation of the apparatus.

Brewing apparatus suitable for use in vending machines for preparing single cup quantities of beverages from beverage material is well known in the prior art. For example, U.S. Pat. No. 3,349,690 issued to William Heier discloses one construction for such a brewing apparatus.

Referring to FIG. 1 on the application drawings, the basic construction and brewing cycle of a prior art apparatus will be described. Frame 1 of the apparatus supports a vertically movable open-bottom cylinder 2 which has the bottom opening covered by a filter member 3. A vertically movable piston 4 is disposed within cylinder 2 and relative movement between cylinder 2 and piston 4 is created by operation of a cam member 5 driven by motor 6. One end opening of a duct 7 is connected with a water tank (not shown) through electromagnetic valve 9, this end opening being closely placed above the upper opening of cylinder 2 to supply hot water into cylinder 2. A brewing cavity 10, which is generally recripocable horizontally between a brewing position (this position being shown by solid lines in FIG. 1), is placed beneath the cylinder 2 and sealed with the lower portion of cylinder 2 in the brewing position.

The prior art apparatus is also provided with a coffee hopper 11 which is connected with a canister 12 for receiving a charge of coffee. The ground coffee fills canister 12 which is provided with suitable feed means to deliver a predetermined quality of fresh ground coffee from hopper 11 at a point prior to the start of the brewing operation.

In the apparatus, brewing cavity 10 at the start of a brewing cycle initiated by a coin operation moves from the rest position to a place beneath the bottom opening of the cylinder 2. During this horizontal movement, the ground coffee is supplied into the brewing cavity 10 from the coffee hopper 11 at a supply position (this position being indicated by dotted lines in FIG. 1). When, brewing cavity 10 is properly aligned beneath the cylinder 2 due to the operation of cam member 5, cylinder 2 moves downwardly into tight engagement with cavity 10. This forms a chamber which is filled with hot water supplied through duct 7.

Therefore, piston 4 moves downwardly to force the water through the filter member 3 into the ground coffee in cavity 10 and through an outlet conduct 13 to a cup 14 placed at a dispensing station. Before introducing coffee into the cup, the extracted coffee would be mixed with a suitable amount of sugar and/or cream, both of which are supplied from canisters 15 and 16, respectively. Thereafter, the brewing cavity 10 containing the spent coffee grounds is moved to its rest position and the grounds in the brewing cavity 10 are discarded at a position which is disposed just before the rest position is reached. When the brewing cavity 10 is returned to its rest position one brewing cycle has been completed.

During the brewing cycle, vertically reciprocal movement of cylinder 2 is guided by the frame 1, i.e., guide rods 2a and 2b on cylinder 2 which are aligned with the supporting portion 1a of frame 1. On the other hand, if the brewing apparatus is continuously operated to prepare several cup of drinks, the cylinder 2 becomes expanded by thermal expansion. Therefore, the connecting portion between cylinder 2 and guide rods 2a and 2b is moved outwardly due to thermal expansion and becomes offset from the axis of supporting portion 1a of frame 1. As a result of this offset of the axis of guide rods 2a and 2b relative to supporting portion 1a, smooth downward movement of cylinder 2 becomes obstructed such that the sealing situation between cylinder 2 and cavity 10 becomes loose. Thus, leakage of hot water occurs between the engagement portion of cylinder and brewing cavity while proceeding with the extracting operation.

SUMMARY OF THE INVENTION

It is a primary object of this invention to provide an improved beverage brewing apparatus which provides good extracting operations while continuously preparing several cups of drinks.

It is another object of this invention to provide a beverage brewing apparatus which is provided with a sealing securing means to improve sealing between the cylinder and brewing cavity.

It is still another object of this invention to provide a beverage brewing apparatus capable of easily replacing existing apparatus by simple modification of the existing apparatus.

Beverage brewing apparatus according to this invention includes a frame, and a vertically movable brewing liquid cylinder which is supported by the frame, this cylinder having an open top and an open bottom. A piston member is reciprically disposed within the cylinder. Brewing liquid supply means which has a discharge opening positioned to discharge brewing liquid into the open top of the cylinder is connected to a liquid heating tank in which a brewing liquid is stored. A brewing cavity is disposed beneath the cylinder to be horizontally reciprocable between a brewing position and a rest position. The ground beverage material is supplied into the brewing cavity through ground material supply means. A cam member which is rotated by a motor controls the relative movement of the cylinder and piston, and also determines the timing of the supply of liquid and beverage material. A compression spring is disposed between the frame and the cylinder to normally push down the cylinder, whereby the brewing cavity is tightly engaged with the open bottom of the cylinder to form the brewing chamber when placed in the brewing position.

Further objects, features and other aspects of this invention will be understood from the following detailed description of the preferred embodiment of this invention while referring to the annexed drawings.

BREIF DESCRIPTION OF THE DRAWINGS

DETAILED DESCRIPTION OF THE PREFERRED EMBODIMENTS

Figure 1:
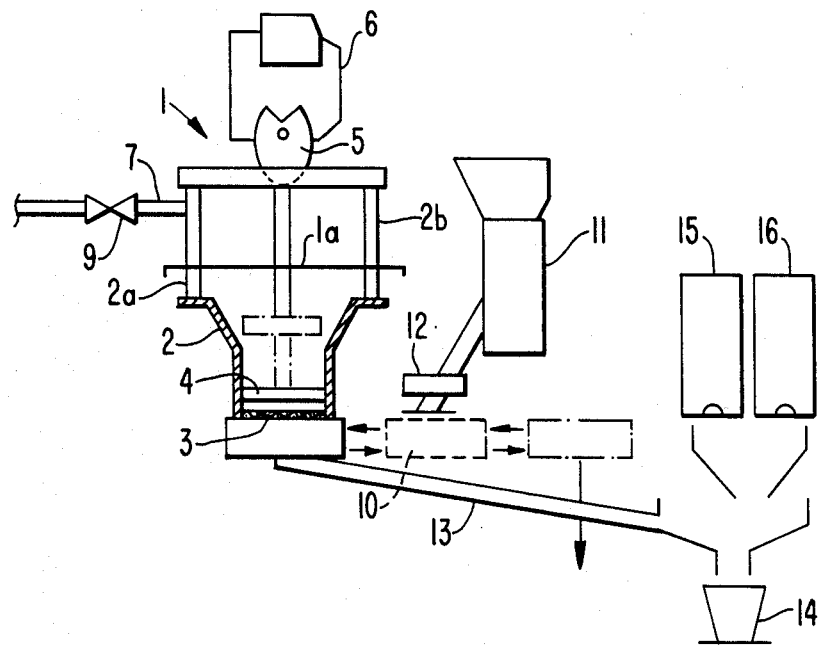
FIG. 1 is a diagramatic view of a prior art brewing apparatus to illustrate the basic construction and brewing cycle.
Figure 4:
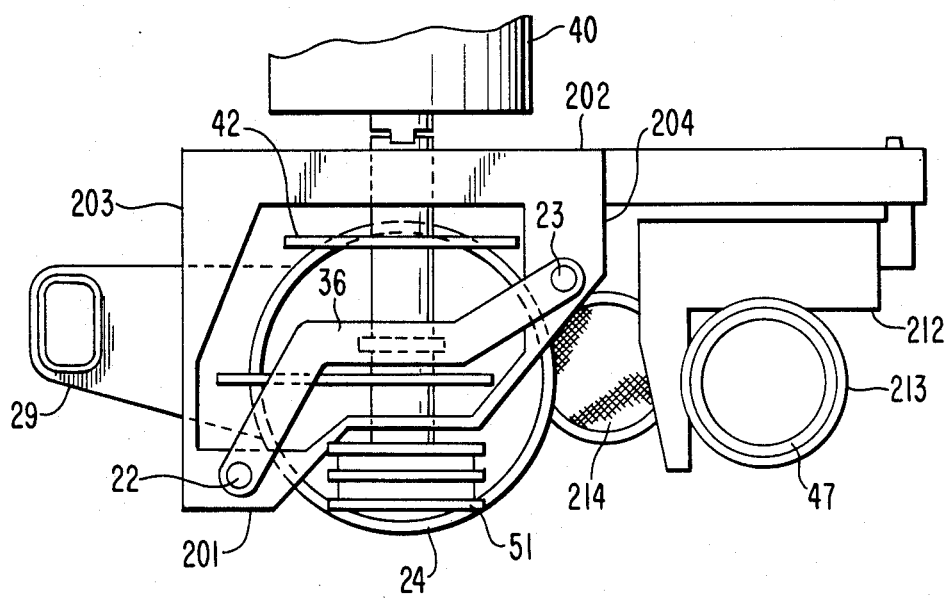
FIG. 4 is a plan view of the beverage brewing apparatus of FIG. 2.
Figure 2:
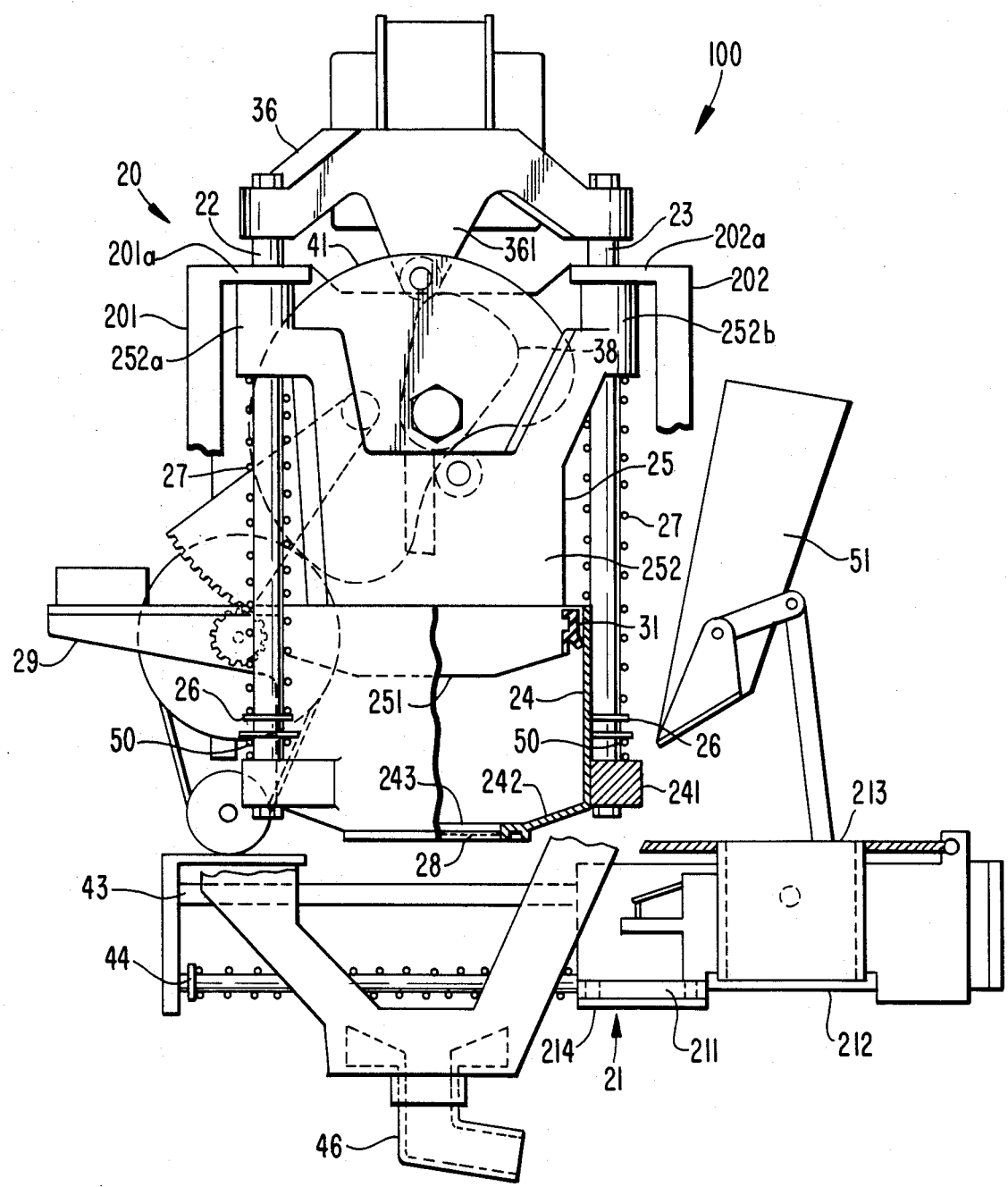
FIG. 2 is a partial sectional front view of a beverage brewing apparatus according to one embodiment of this invention.
Figure 3:
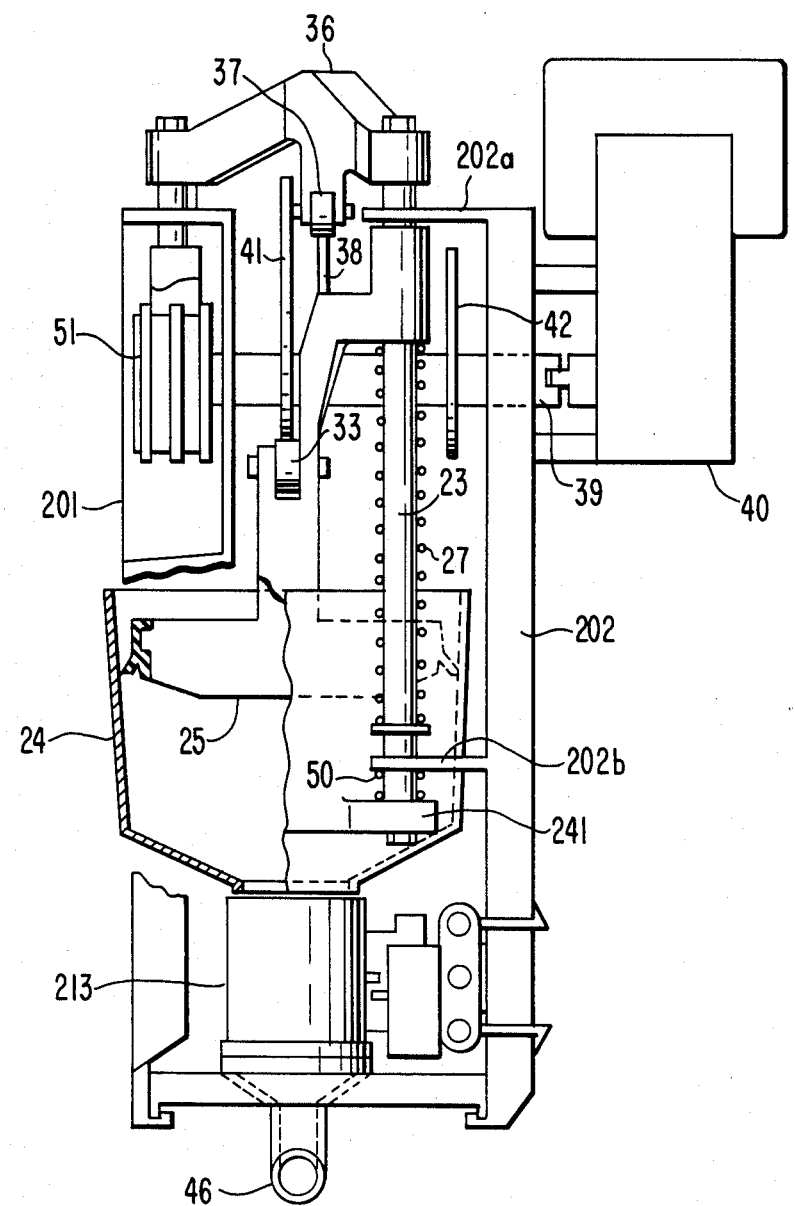
FIG. 3 is a partially cutaway side view of the beverage brewing apparatus of FIG. 2.

Referring to FIGS. 2-4, a beverage brewing apparatus 100 in accordance with the present invention is shown. The brewing apparatus 100 includes a frame body 20 defined by a front wall 201, rear wall 202 and side walls 203 and 204. Rear wall 202 provides a base portion 21 including a filter supporting carriage 211 and brewing cavity carriage 212 to be described hereinafter. The side walls 203 and 204 are used to maintain the proper spaced relation between front and back walls 201 and 202.

A front guide rod 22 is mounted on front wall 201 and a rear guide rod 23 is supported on rear wall 202. Guide rods 22 and 23 are generally diagonally opposite one another within the frame body 20 and support a brewing cylinder 24 and piston 25 to be described hereinafter.

Brewing cylinder 24 has a pair of supporting portions 241 projecting from the outer peripheral surface thereof. Each of rods 22 and 23 expends vertically and is fixed to one of the supporting portions 241. Rear rod 23 is supported by a pair of bearing supports 202a and 202b projecting from upper and lower portions of rear wall 202. Front rod 22 is also supported by a corresponding pair of supports 201a and 201b on front wall 201. A snap ring 26 is fitted on each of guide rods 22 and 23, located above the lower bearing supports 201b and 202b, and a spring 27 surrounds each of rods 22 and 23 located above ring 26 (shown in FIG. 5). Thus, cylinder 24 is fixed to and movable with rods 22 and 23.

As clearly shown in FIG. 2, cylinder 24 has a top opening and lower opening 243. It also has a sloped bottom 242 which extends to the reduced diameter lower opening 243 and is coaxial therewith. The lower opening 243 is covered by a fine mesh screen 28 which is removably disposed within opening 243. This screen 28 prevents coffee grounds or other extract material from entering into cylinder 24 together with the hot water while the brewing operation is in progress.

Cylinder 24 is provided with a series of inlet ports 244 at its upper inner periphery and a chute 29 extends from the outer peripheral surface of cylinder 24 communicating with the interior by way of inlet ports 244. Chute 29 has a sloping bottom wall which communicates with the inlet ports 244 so that hot water may be introduced into cylinder 24 through chute 29 at a location below piston 25 when piston 25 is is in its uppermost position.

Figure 5:
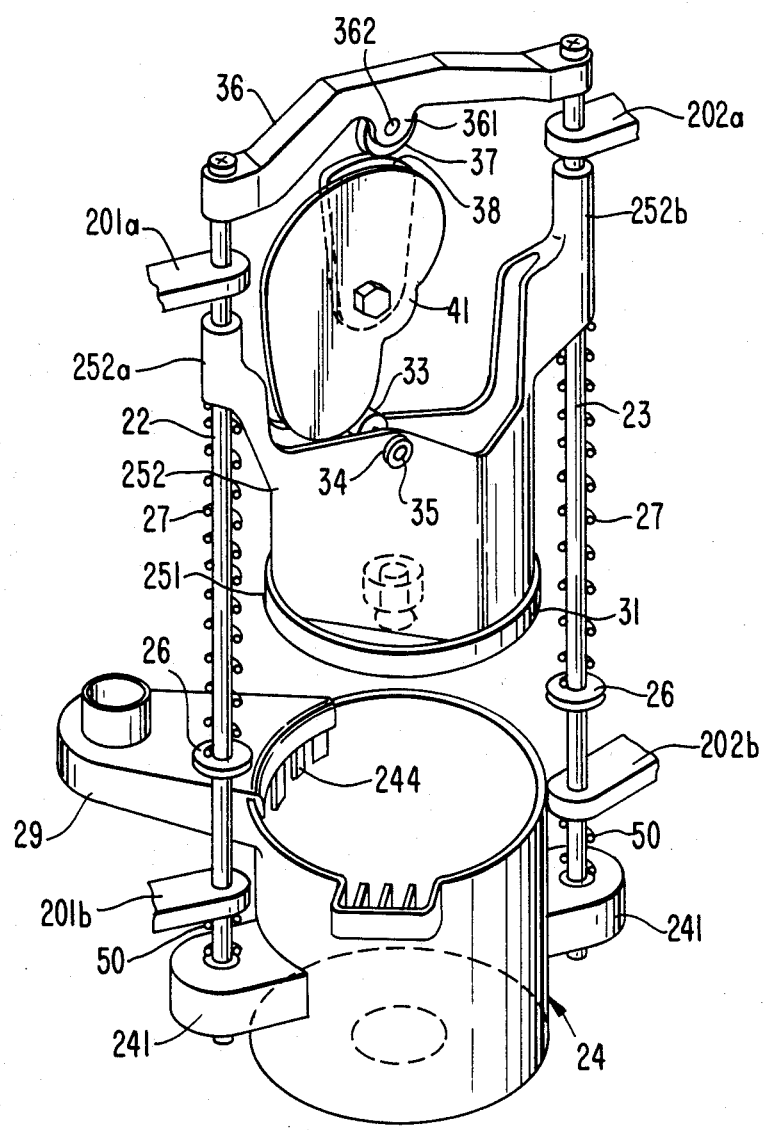
FIG. 5 is a diagramatic exploded perspective view of the cylinder, piston and frame used in the brewing apparatus of FIG. 2.

Piston 25 remains at all times within cylinder 24 and comprises lower circular piston portion 251 and upper U-shaped bridge portion 252. Both portions 251 and 252 are connected with one another by a bolt-nut arrangement as shown in FIG. 5. A seal element 31 is placed on the outer peripheral surface of lower portion 251 to effect sealing between the cylinder 24 and piston 25. Each of the ends 252a and 252b of upper portion 252 is formed with a bore hole through which one of the rods 22 and 23 extends. The upper ends of the springs 27 which are disposed to surround rods 22 and 23, respectively, are contacted with the undersides of the ends 252a and 252b of bridge 252. Springs 27 thereby apply force between snap rings 26 and ends 252a and 252b of bridge 252, thereby biasing piston 25 upwardly.

A cam follower 33 and a centering roller 34 are rotatably supported on bridge 252 through a shaft 35 disposed to extend through the center portion of bridge 252. The ends 252a and 252b of bridge 252 constitute a pair of bearing guides working as a three point suspension in conjunction with seal element 31 on piston 25.

A cylinder operating bridge 36 has its ends secured to the upper ends of rods 22 and 23, respectively. The arrangement is such that with cylinder 24 being fixed on the lower ends of rods 22 and 23, and cylinder operating bridge 36 being fixed on the upper ends of rods 22 and 23, there is provided a positive fixed mounting system for insuring parallelism of rods 22 and 23 thereby insuring smooth upward and downward movements of vertical arm 361 extending downwardly from bridge 36. The arm 361 of bridge 36 is provided with a slot in its lower end which rotatably supports a cam follower 37 on a support shaft 362 on arm 361, cam follower 37 cooperating with a cam 38.

A cam shaft 39 extends between front and rear walls 201 and 202. Rear wall 202 has a hole (not shown) through which one end of cam shaft 39 extends. This end of cam shaft 39 is connected with a motor device 40. Three cams including a first cam 41 acting as the piston cam cooperating with piston cam follower 33, a second cam 38 cooperating with the bridge cam follower 37 and third cam 42, are secured to cam shaft 39 spaced therealong as shown in FIG. 3.

Base portion 21 includes upper and lower rods 43 and 44. Brewing cavity carriage 212 which supports brewing cavity 213 is slidably supported on rods 43 and 44. Filter support carriage 211 in which filter 214 is removably disposed is also slidably supported on rods 43 and 44. Brewing cavity 213 has a groove formed in its upper surface to retain a seal element 47 that assures sealing between the lowermost surface of cylinder 24 and brewing cavity 213.

A bias spring 50 surrounds each of the rods 22 and 23 located in the space between lower bearing supports 201b and 202b, and supporting portions 241 of cylinder 24. Thus, the cylinder 24 is usually pushed dowardly. As shown in FIGS. 2 and 5, the coil springs 50 are used as bias springs in one embodiment of this invention. Alternatively, leaf springs may be used as the bias springs.

In the above described beverage brewing apparatus, upon initiation of an electrical input which may be caused in response to introducing a coin into a dispensing mechanism, motor 40 turns cam shaft 39 clockwise.

By reason of the rotation of cam shaft 39, brewing cavity carriage 212 moves horizontally toward the left side in FIG. 2 through operation of third cam 42. When brewing cavity 213 is disposed above filter support carriage 214, a predetermined amount of ground coffee is supplied into brewing cavity 213 from coffee hopper 51. After brewing cavity 213 receives ground coffee, brewing cavity 213 continues to move toward the left side together with filter support carriage 214. When brewing cavity 213 is properly aligned beneath cylinder 24, movement of cavity 213 and support carriage 212 is stopped and cylinder 24 moves downwardly into tight engagement with cavity 213. The tight sealing between cylinder 24 and brewing cavity 213 is secured by seal element 47 disposed on the upper surface of brewing cavity 213. On the other hand, downward movement of rods 22 and 23 is guided by bearing supports 201a, 201b, 202a and 202b. However, if the end portion of each rod 22 and 23 is moved outwardly due to heat expension of cylinder 24 which usually occurs by reason of the continuous preparation of several successive cups of drinks, the alignment of the center lines of the rods and center lines of the bearing supports is disturbed so that smooth movement of rods 22 and 23 is obstructed. However, the sealing force between the cylinder 24 and the brewing cavity 213, i.e., the downward force against the cylinder 24 to secure sealing therebetween is insured by reason of the bias springs 50.

As cam shaft 39 continues to rotate, a predetermined amount of hot water is supplied into cylinder 24 through chute 29. The timing for the supply of the ground coffee into brewing cavity 213 and hot water into cylinder 24 is controlled by the rotation of pulley 51 fixed on the front end of cam shaft 39 extending from front wall 201.

As piston cam 41 rotates, piston 25 moves dowardly and during this downward movement of piston 25, the ends 252a and 252b of bridge portion 252 compress springs 27 surrounding guide rods 22 and 23 to ensure sealing of seal element 47 disposed on brewing cavity 213 with a seal element (not shown) placed between the lower most opening of brewing cavity 213 and filter 214. During the brewing operation, springs 27 are continuously compressed by the downward movement of U-shaped bridge 252 to insure sealing between cylinder 24 and brewing cavity 213, and between cavity 213 and filter 214. After piston 25 has passed water inlet ports 244 on the upper inner wall surface of cylinder 24, a layer of sealed air is trapped between the top of the hot water surface and bottom face of piston 25.

When piston 25 reaches a lowered position whereat all of the hot water has been forced through the coffee in brewing cavity 213, piston 25 continues downwardly at a slighted increased speed to enforced hot air through the spent ground coffee. Just prior to the end of its downward stroke, piston 25 approaches zero downward accelration. The hot air passed through the spent ground coffee tends to dry out the grounds, thereby rendering them in a dry enough state so that they may be easily discharged. The extracted beverage is supplied to a cup (not shown) through funnel 46.

When piston 25 reaches the end of its downward stroke, cylinder 24 and piston 25 are moved slightly upwardly to clear the top flange on brewing cavity 213. Therefore, brewing cavity 213 is free to be easily released from the brewing position and moved toward the right side in FIG. 2.

When the filter support carriage 211 reaches a predetermined position, further movement of the filter support carriage 211 is stopped, but brewing cavity carriage 212 continues its rightward movement and finally reaches the rest position while discharging the spent ground coffee.

As mentioned above, the cylinder is normally pushed downwardly by bias springs to thereby insure that sealing of the cylinder and the brewing cavity is maintained. Therefore, leakage of hot water through the engaging portions between cylinder and the brewing cavity is prevented, even if downward movement of the cylinder as guided by the rods is interefered with due to heat expansion of the cylinder.

This invention has been described in detail in connection with a preferred embodiment, but the preferred embodiment is an example only and this invention is not to be considered as restricted thereto. It will be easily understood by those skilled in the art that other variations and modifications are to be contemplated within the scope of the appended claims.

I claim:

1. In a beverage brewing apparatus comprising a frame, a vertically movable cylinder member supported on said frame, said cylinder member having an open top and open bottom, a vertically movable piston member disposed in said cylinder and supported by said frame, means for supplying hot water into said cylinder below the elevation of said piston, a base assembly including a brewing cavity disposed beneath said cylinder member, said brewing cavity being mounted to be movable horizontally between a brewing position and a discharge position and be sealed with said cylinder member in said brewing position, a motor driven cam shaft, a plurality of cams on said cam shaft and cam followers to determine the movement of said cylinder and said piston, the improvement comprising biasing means disposed between said frame and said cylinder to normally push said cylinder downwardly to insure sealing between said cylinder and said brewing cavity when said brewing cavity is disposed at the brewing position.

2. The beverage brewing apparatus of claim 1 wherein said biasing means is a coil spring.

* * * * *